(12) United States Patent
Chiang

(10) Patent No.: US 8,068,734 B2
(45) Date of Patent: Nov. 29, 2011

(54) MAPPING A CLIENT SIGNAL INTO TRANSPORT FRAMES

(75) Inventor: Ting-Kunag Chiang, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 798 days.

(21) Appl. No.: 12/060,097

(22) Filed: Mar. 31, 2008

(65) Prior Publication Data

US 2009/0245793 A1    Oct. 1, 2009

(51) Int. Cl.
H04J 14/02 (2006.01)

(52) U.S. Cl. ............ 398/79; 398/75; 398/74; 398/82; 398/98

(58) Field of Classification Search ........... 398/75, 398/74, 79, 82, 98, 47, 175
See application file for complete search history.

(56) References Cited

U.S. PATENT DOCUMENTS

| | | | |
|---|---|---|---|
| 5,170,273 A * | 12/1992 | Nishio ................... | 398/48 |
| 7,716,560 B1 * | 5/2010 | Sprague et al. .......... | 714/776 |
| 7,734,191 B1 * | 6/2010 | Welch et al. ............ | 398/192 |
| 7,860,400 B2 * | 12/2010 | Cole ..................... | 398/155 |
| 2003/0020985 A1 * | 1/2003 | LaGasse et al. ......... | 359/135 |
| 2003/0185564 A1 * | 10/2003 | Hayashi et al. .......... | 398/33 |
| 2004/0208554 A1 * | 10/2004 | Wakai et al. ............ | 398/54 |
| 2005/0286521 A1 * | 12/2005 | Chiang et al. .......... | 370/389 |
| 2006/0002706 A1 * | 1/2006 | Lee et al. ............... | 398/71 |
| 2007/0223496 A1 * | 9/2007 | Izumi .................... | 370/397 |
| 2009/0190466 A1 * | 7/2009 | Girardi et al. ........... | 370/216 |
| 2010/0021166 A1 * | 1/2010 | Way ...................... | 398/79 |
| 2010/0080561 A1 * | 4/2010 | Paranjape et al. ........ | 398/79 |

* cited by examiner

*Primary Examiner* — Kenneth N Vanderpuye
*Assistant Examiner* — Hibret Woldekidan
(74) *Attorney, Agent, or Firm* — North Weber & Baugh LLP; David L. Soltz

(57) ABSTRACT

Embodiments of the present invention provide a systems, devices, and methods in which a client signal is divided into a plurality of channels, mapped within transport frames, and combined into a WDM transport signal. These embodiments include intra-nodal redundancy that protects against failure events within the transport transmitter. In particular, redundancy is provided within a network transport transmitter such that redundant paths are available so that electrical channels may be routed around a malfunctioning component within the transmitter.

16 Claims, 7 Drawing Sheets

MAPPING A CLIENT SIGNAL INTO TRANSPORT FRAMES

BACKGROUND

A. Technical Field

This invention relates generally to optical communication networking systems, and more particularly, to the transmission of high speed client signals across a transport network.

B. Background of the Invention

The capacity of transport systems is continually increasing to provide larger amounts of available bandwidth to clients. These transport systems are able to communicate large amounts of data using optical networking technologies. In certain systems, wavelength division multiplexed (hereinafter, "WDM") transport systems communicate this data on multiple wavelengths between terminal nodes. These WDM systems offer a network provider scalable bandwidth without having to significantly expand the physical infrastructure of a network to realize this additional bandwidth.

Certain transport systems are designed to receive a client signal, re-format the client signal and transmit this reformatted client signal over a long-haul connection. The client signal is subsequently reconstructed at a receiver in the transport system and delivered to the client network. The transport system may operate in accordance with various standard protocols, such as the Optical Transport Network (hereinafter, "OTN") protocols, or proprietary formats and procedures.

Transport systems are designed to interface with various types of client networks. In so doing, the transport system maps data from a client signal into a transport frame in which the data propagates across a transport connection. This mapping procedure is typically specific to the protocol of the client signal and the format of the transport system so that the client signal may be completely reconstructed at a transport receiver. The transport terminal nodes, both transmitter and receiver nodes, are generally able to operate in different modes depending on the type of client signal that is being processed. For example, a transport terminal node may map a client SONET frame into a transport frame using a first mapping procedure or an Ethernet frame into a transport frame using a second mapping procedure.

The transmission characteristics of the client data across the transport connection may depend on both the protocol and rate of the particular client signal. If a client signal is transmitted at a higher rate than the channel rate of the transport system, then the client data is transmitted across multiple channels in the transport system. This multi-channel transmission of client data preserves the rate of the client signal and allows efficient reconstruction of the client signal at a transport receiver node.

Transport technologies have been and are currently being developed to enable efficient communication of this client data on a transport system. In certain transport systems, the client data is transmitted across the transport system on multiple wavelengths. As a result, legacy transport networks are able to adapt to the ever-increasing optical signaling rates by dividing the client signal across multiple wavelength channels within the transport network. For example, there are many transport networks currently deployed that communicate 10 Gbps wavelengths within a WDM transport signal. A 40 Gbps client signal may be transmitted across this transport network by dividing the client signal into at least four channels. These channels are mapped within frames of the transport network and optically multiplexed into a WDM signal. The WDM signal is received at a network receiver and the client signal is reconstructed from the channels.

FIG. 1 generally illustrates an exemplary WDM transport transmitter. The transmitter receives a client signal 115 that has a higher rate than the transport network rate. If the client signal 115 is an optical signal, then an O/E converter 130 converts it to a corresponding electrical signal 117. A demultiplexer 120 demultiplexes the electrical signal 117 into a plurality of electrical channels.

Each of the electrical channels is coded and mapped into a transport frame. For example, a first channel is provided to a first coder/processing module 140 that encodes, and otherwise processes, the data within the first channel in preparation for framing. The first coder/processing module 140 may also insert error correction information within the first channel. A framer 150 maps the coded data and error correction information into transport frames in preparation for transmission across the transport network.

After framing, an E/O converter 160 converts the framed data and information within the first channel to an optical transport signal on a unique wavelength. The rate of this optical transport signal is equal to the rate of the transport network, which as previously discussed, is less than the rate of the client signal received at the transmitter input.

The optical transport signal is multiplexed by an optical multiplexer 170 with other optical transport signals generated from other channels within the transmitter. These other optical transport signals include, but are not limited to, other channels containing data that was demultiplexed from the client signal. The optically multiplexed transport signals comprise a WDM transport signal 175 that is communicated across the transport network.

Network redundancy is important to ensure the integrity of the client signal as it is being transported within the transport network. This network redundancy should be present at both inter-nodal and intra-nodal levels so that a failure event does not destroy a client signal. An intra-nodal failure may be a non-operational component within a node, such as the WDM transport transmitter described above, resulting in one or more channels being lost therein.

SUMMARY OF THE INVENTION

Embodiments of the present invention provide a systems, devices, and methods in which a client signal is divided into a plurality of channels, mapped within transport frames, and combined into a WDM transport signal. These embodiments include intra-nodal redundancy that protects against failure events within the transport transmitter. In particular, redundancy is provided within a network transport transmitter such that redundant paths are available so that electrical channels may be routed around a malfunctioning component within the transmitter.

In certain embodiments, an optical splitter receives an optical client signal and replicates that signal onto multiple outputs. Each of these replicated client signals is converted from the optical domain to the electrical domain using an O/E converter. A unique subset of bits is selected from each of these electrical replicated client signals using a plurality of data selectors. Each data selector aligns its corresponding subset of bits into an electrical channel. In various embodiments of the invention, this selection of data is done in relation to bit slot positions within the client signal such that one data selector selects certain data slots and another data selector selects other data slots.

Each of the electrical channels containing the unique subsets of bits is mapped into a transport frame. This mapping may be performed in accordance with a standard specification or a proprietary mapping scheme. Thereafter, the mapped data is converted into optical channels by a plurality of E/O converters. In certain embodiments, each of the optical channels contains a unique optical wavelength on which these subsets of bits are modulated.

An optical multiplexer combines the optical channels into a WDM signal which is transmitted onto the transport network. This WDM signal is received at a transport receiving node which reconstructs the client signal from wavelengths within the WDM signal. This reconstructed client signal may then be provided to a client network from the transport receiving node.

Certain features and advantages of the invention have been generally described in this summary section; however, additional features, advantages, and embodiments are presented herein or will be apparent in view of the drawings, specification, and claims hereof. Accordingly, it should be understood that the scope of the invention is not limited by the particular characterizations presented in this summary section.

BRIEF DESCRIPTION OF THE DRAWINGS

Reference will be made to embodiments of the present invention, examples of which are shown in the accompanying figures. Those figures are intended to be illustrative, however, rather than limiting. Although the present invention is generally described in the context of the embodiments shown in the accompanying figures, the scope of the present invention is not restricted to the details of those particular embodiments.

DETAILED DESCRIPTION OF THE PREFERRED EMBODIMENTS

In the following description, for the purpose of explanation, specific details are set forth in order, by the use of concrete examples, to provide a sound understanding of the present invention. It will be apparent; however, that the present invention may be practiced without some or even all of those details, and it will be recognized that embodiments of the present invention, some of which are described below, may be incorporated into a number of different devices, systems, and methods. Structures, devices, and methods depicted in block diagram are merely illustrative of exemplary embodiments of the present invention and are included in that form in order to avoid obscuring essential teachings of the present invention.

Furthermore, connections between components in the figures are not restricted to connections that are effected directly. Instead, connections illustrated in the figures between components may be modified or otherwise changed through the addition thereto of intermediary components, without departing from the teachings of the present invention.

Reference in the specification to "one embodiment" or "an embodiment" indicate that a particular feature, structure, characteristic, function, or method step described in connection with that embodiment is included in at least one embodiment of the present invention. The various uses of the phrase "in one embodiment" at different locations throughout the specification do not necessarily constitute multiple references to a single embodiment of the present invention.

Figure 1:
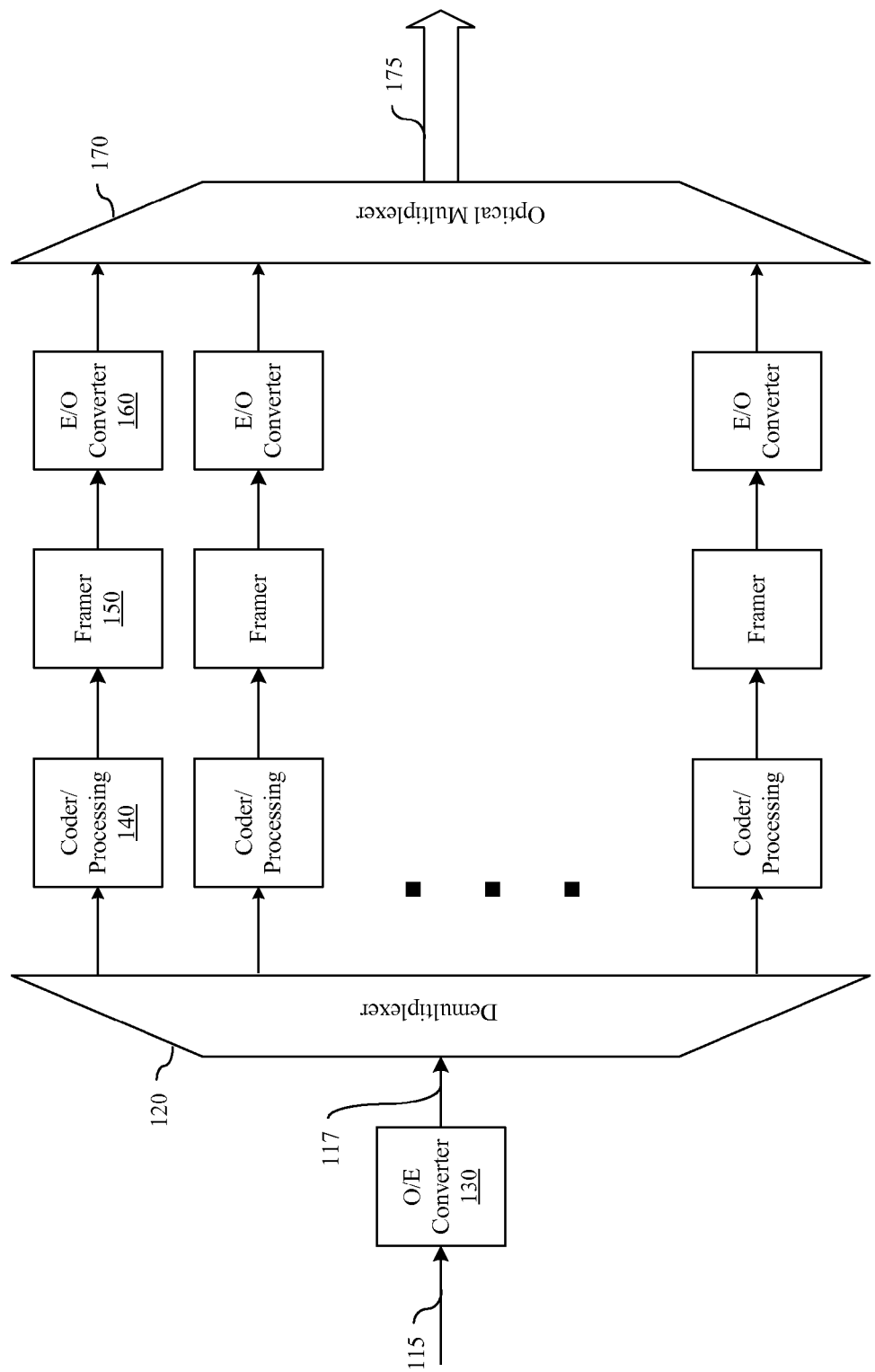
FIG. 1 is a prior art illustration of an exemplary WDM transport transmitter.
Figure 2:
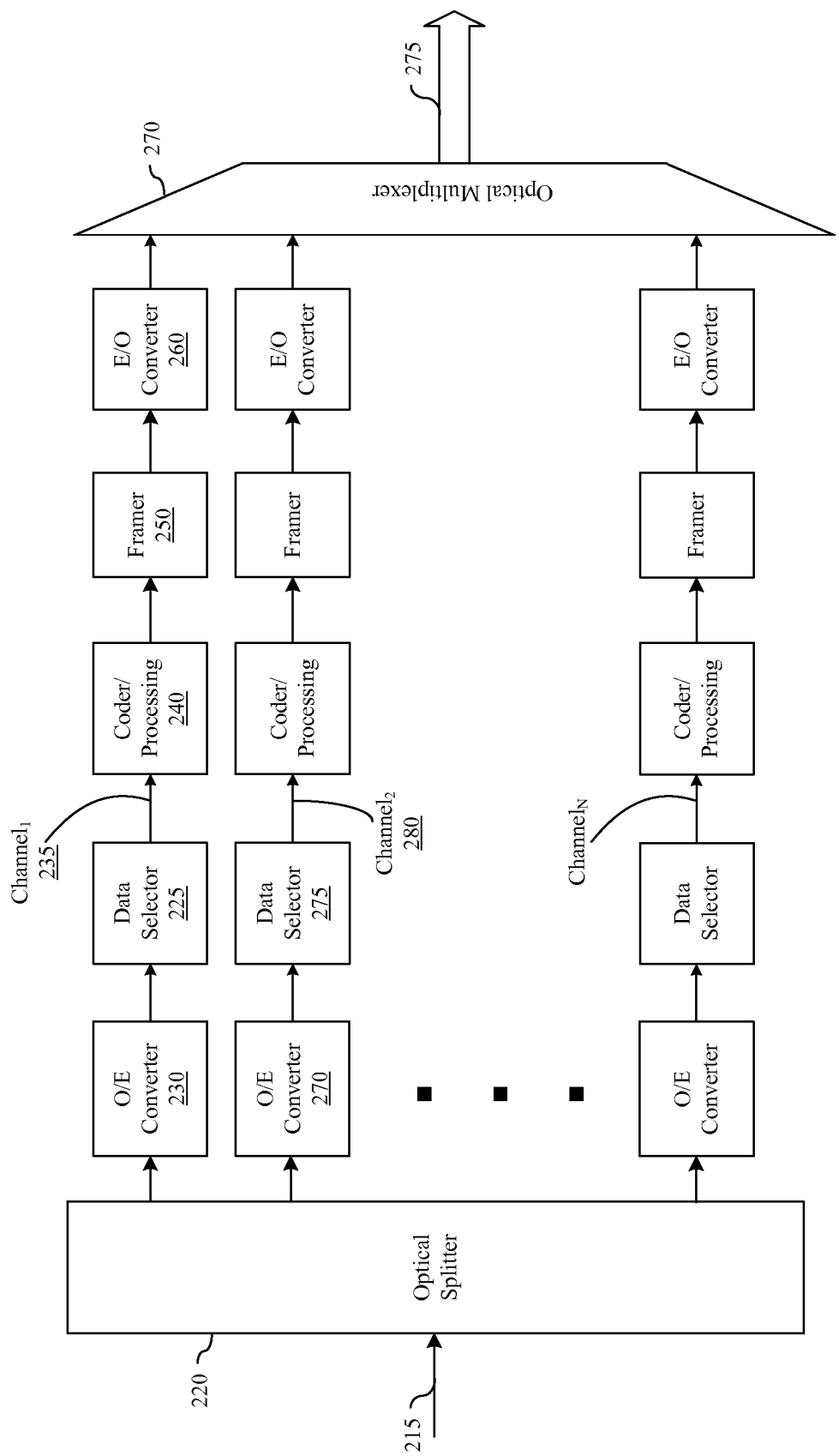
FIG. 2 illustrates a WDM transport transmitter according to various embodiments of the invention.

FIG. 2 is a general block diagram of an optical transmitter according to various embodiments of the invention. An optical client signal 215 is received at an optical splitter 220 and replicated on multiple outputs. This replication produces copies of the client signal on each of the outputs. Each output signal from the optical splitter 220 is received at an optical-to-electrical converter 230 ("O/E converter"), which generates a corresponding electrical signal. Each of these electrical signals is an electrical representation of the optical client signal 215.

A plurality of data selectors are coupled to the O/E converters and effectively divide the client signal across a plurality of parallel channels by each data selector selecting and transmitting a subset of bits within the client signal. For example, a first data selector 225 receives an electrical signal from the O/E converter 230 and selects a first subset of bits within the electrical signal. This first subset of bits is communicated in a first electrical channel 235. A second data selector 275 also receives an electrical signal from another O/E converter 270 and selects a second subset of bits within the electrical signal that is different from the first subset. This second subset of bits is transmitted within a second electrical channel 280. This process is repeated across N number of data selectors until the client signal is divided across the N electrical channels.

Each of these N electrical channels is processed and formatted in preparation for transmission onto a transport network. Referring to the first channel 235, a coder/processing module(s) encodes the data within the first channel 235 and may perform various processing functions such as the insertion of error correction information, such as forward error correction, within the channel. Thereafter, the encoded data is mapped into transport frames by a framer 250 and converted back into the optical domain by an electrical-to-optical converter 260 ("E/O converter"). Each of the N electrical channels is modulated onto corresponding optical wavelengths resulting in multiple optical wavelengths carrying information from the client signal.

These optical wavelengths are combined into a WDM signal 275 by an optical multiplexer 270. In various embodiments of the invention, this optical multiplexer 270 is an arrayed waveguide grating. The WDM signal 275 is communicated across the transport network and received at a receiving node where the client signal is reassembled from the optical wavelengths within the WDM signal. The wavelengths within the WDM signal 275 may all be on unique wavelengths or on a plurality of polarity-shifted wavelengths.

In various embodiments of the invention, the client signal 215 is a 40 Gbps optical signal which is divided across four 10 Gbps channels, each of which is modulated on a unique wavelength. In other embodiments of the invention, the client signal 215 is a 40 Gpbs optical signal which is divided across multiple polarized optical channels.

One skilled in the art will recognize that the replication of the client signal 215 across the multiple outputs of the optical splitter 220 results in a power reduction on each of these outputs. In order to compensate for this power reduction, one or more optical amplifiers may be positioned within the transmitter.

Figure 3:
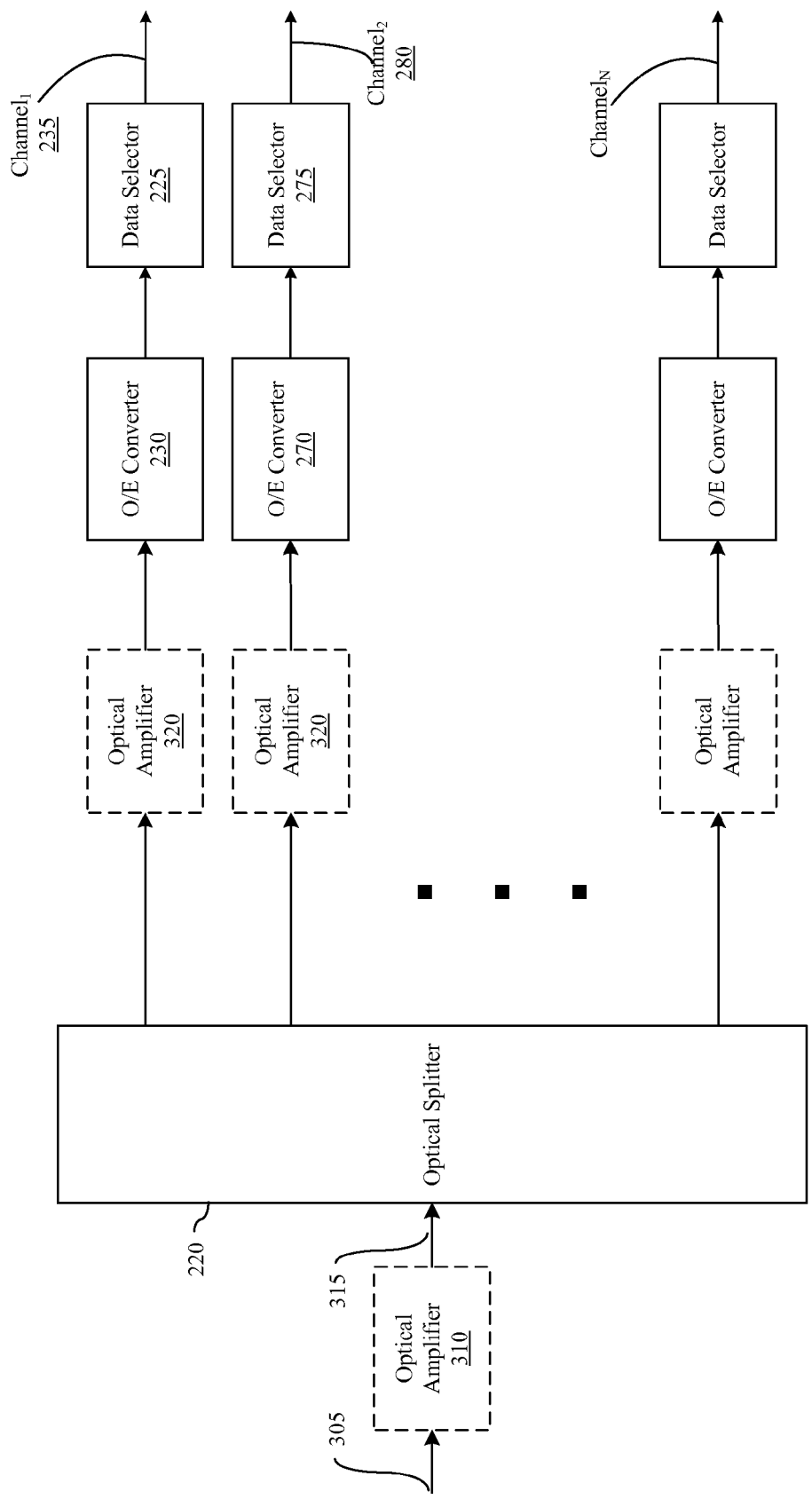
FIG. 3 illustrates an optical amplifier components inserted within the WDM transport transmitter according to various embodiments of the invention.

FIG. 3 illustrates the use of optical amplifiers within the transmitter according to various embodiments of the invention. In one example, an optical amplifier 310 receives the client signal 305, applies a gain to the signal and outputs an amplified client signal 315. The gain across the optical amplifier 310 may be designed such that a preferred power level is realized on each of the outputs of the optical splitter 220. The optical splitter or other components within the transmitter may require a certain optical power level on a signal in order to function properly.

In other embodiments of the invention, a plurality of optical amplifiers 320 is provided on the outputs of the optical splitter 220. As a result, a gain is applied to each of the replicated client signals prior to being converted into the electrical domain. One skilled in the art that the optical amplifier 310 in front of the optical splitter and the optical amplifiers 320 may be a semiconductor optical amplifier(s). The semiconductor optical amplifier(s) may also be integrated within a photonic circuit in certain embodiments.

Figure 4:
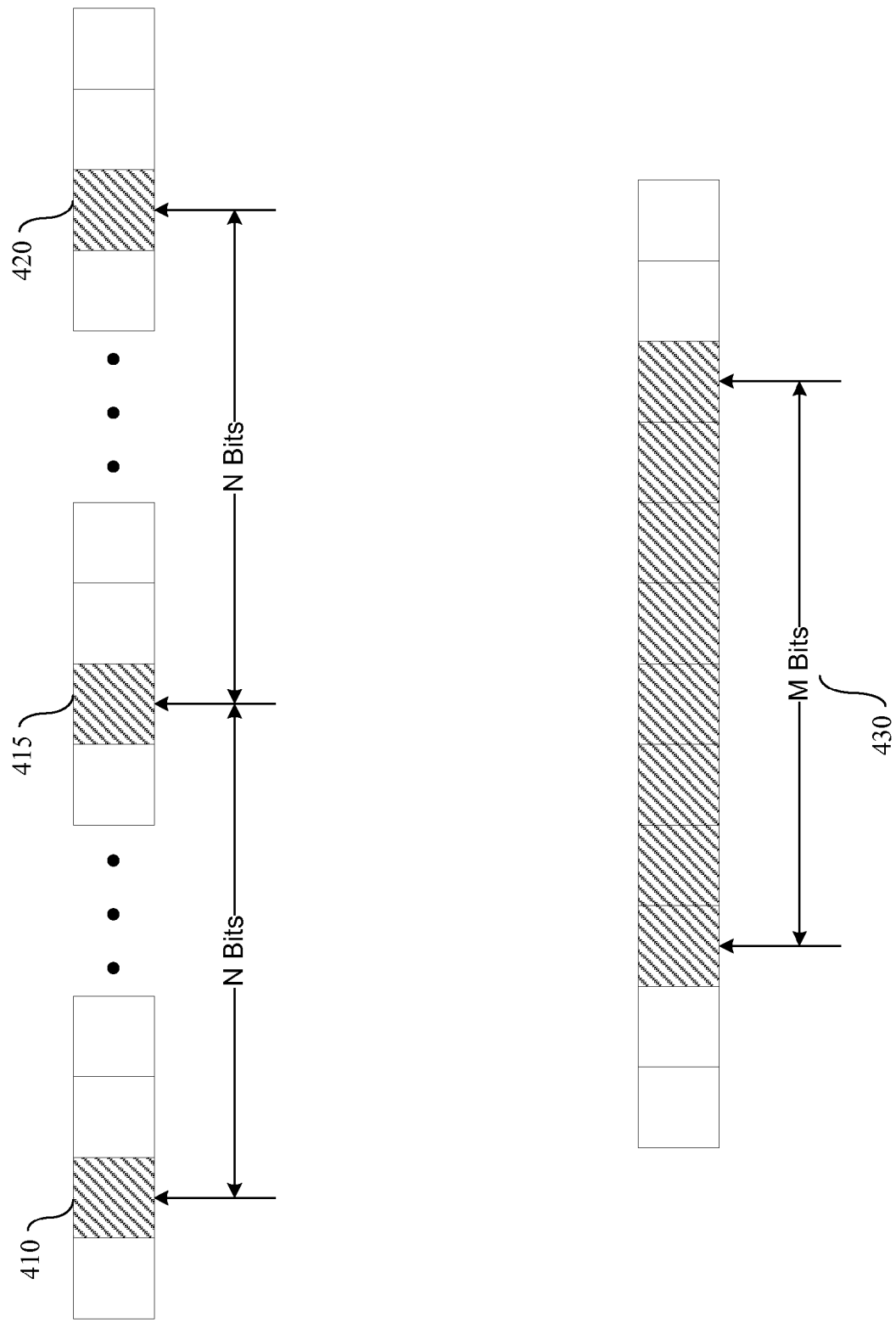
FIG. 4 illustrates exemplary methods for dividing a client signal into multiple electrical channels according to various embodiments of the invention.

FIG. 4 illustrates examples of methods used by the data selector 225 to select bits within a replicated client signal. In a first example, every Nth bit within the bit stream of the replicated client signal is selected and serially aligned into an output stream from the data selector 225. A first bit 410 located within the bit stream is selected, a second bit 415 is selected and a third bit 420 is selected. The sequential spacing between the bits being equal to N bits. These three bits comprise a subset of bits and are then aligned into another stream and output from the data selector 225. In certain embodiments of the invention, N is equal to the number of outputs on the optical splitter 220. The client signal may be reassembled at the receiver using this bit relationship between the channels.

In another example of bit selection, the data selector 225 selects sets of contiguous bits, which comprise a subset of bits, and aligns the selected contiguous bit sets in an output signal. In this example, a bit subset 430 is shown as being M-bits in length, all of the bits being contiguous within the bit stream. One skilled in the art will recognize that the number of bits within the bit subset 430 may vary depending on the design of the data selector and transport system. Once again, the client signal is reassembled at the receiver by using the bit set relationship between each of the channels.

Figure 5:
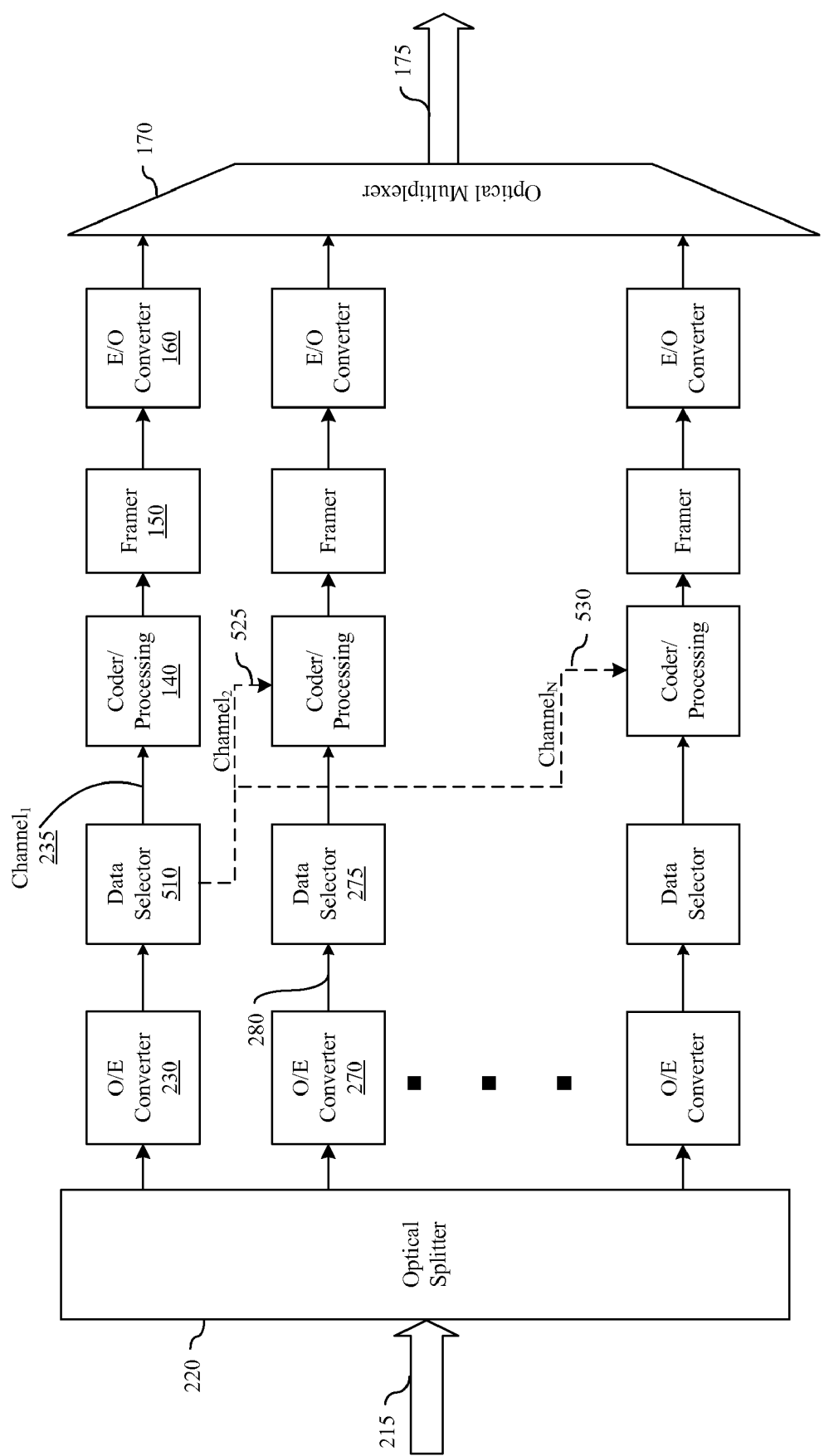
FIG. 5 illustrates a WDM transport transmitter having redundant internal paths according to various embodiments of the invention.

FIG. 5 illustrates a transmitter having integrated channel redundancy according to various embodiments of the invention. This channel redundancy takes advantage of the fact that the replicated client signals contain all of the bits within the input client signal which enables the transmitter to route information around a failed component, such as a failed E/O converter or data selector.

Redundant paths between the electrical channels allows a data selector, such as the data selector 510 in the first channel 235, to retrieve bits from the replicated client signal that would normally be selected and aligned within another channel and transmit those retrieved bits into the other channel using a redundant path. For example, the first data selector 510 is coupled to a redundant path 525 to the second channel and is coupled to another redundant path 530 to the Nth channel. In certain embodiments of the invention, the redundant paths 525, 530 are coupled to coder/processing modules within other channels. However, one skilled in the art will recognize that these redundant paths may insert a bit stream in various locations of an electrical channel.

If the O/E converter 270 or the data selector 275 within the second channel 280 were to fail, the data selector 510 within the first channel 235 would select the bits that would have been selected by the malfunctioning data selector 275 and insert those bits within the second channel 280. This operation may be applied to any malfunctioning channel using redundant paths integrated between the various channels within the transmitter.

Each channel may have an alarm generator that recognizes when a component within a channel is malfunctioning. In certain embodiments, a controller integrated within the transmitter receives the alarm and selects a preferred redundancy path that routes data around the malfunctioning component(s). As a result, a redundant subset of bits may be routed from a functioning channel to a malfunctioning channel to route these bits around a malfunctioning component.

Figure 6:
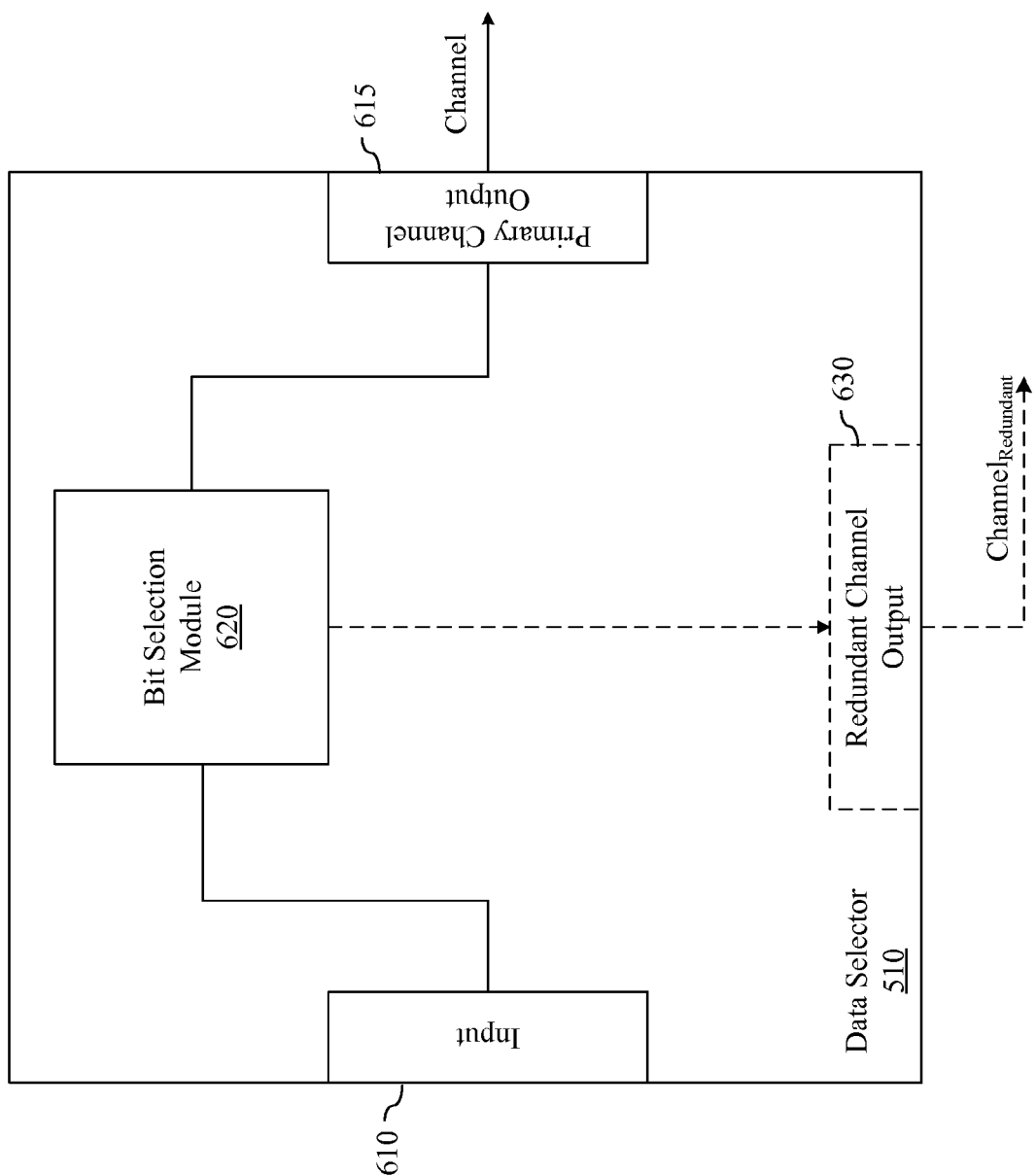
FIG. 6 is an exemplary data selector according to various embodiments of the invention.

FIG. 6 illustrates an exemplary data selector with channel redundancy according to various embodiments of the invention. The data selector 510 comprises a first input 610 on which an electrical replicated client signal is received. A bit selection module 620 receives the electrical replicated client signal and selects certain bits within the signal and aligns these bits within a primary channel. The method in which these bits are selected may vary across different designs and may include the selection methods discussed in relation to FIG. 4.

The selected bits are aligned within the bit selection module 620 and output on a primary channel for the bit selection module 620. These aligned bits are output on a primary channel output 615 for subsequent processing and mapping into transport frame. As previously discussed, these aligned bits comprise a subset of the bits within the electrical replicated client signal received on the first input 610 and will be used with bits in other channels to reconstruct the client signal at a receiver node within a transport network.

In various embodiments of the invention, the bit selection module 620 may also be able to select a redundant subset of bits from the electrical replicated client signal. This redundant subset of bits may be used to route bits around a failed component within another channel within the transmitter. For example, a bit selection module within another channel may malfunction and require that the bits, normally selected by the malfunctioning bit selection module, be selected by the bit selection module 620 and inserted into the failed channel.

A redundant channel output 630 provides an interface on which these redundant subset of bits may be transferred onto a redundant channel and inserted into the malfunctioning channel. In various embodiments of the invention, the redundant channel output 630 comprises switching functionality that allows the redundant subset of bits to be transferred to a preferred redundant channel within a plurality of potential redundant channels. The bit selection module 620 is able to select a redundant subset of bits and insert those bits in one of many channels within the transmitter. As a result, the bit selection module 620 is able to provide redundancy for multiple channels within the transmitter.

One skilled in the art will recognize that various redundant channel configurations may be employed to connect the bit selection module 620 to numerous channels within the transmitter.

Figure 7:
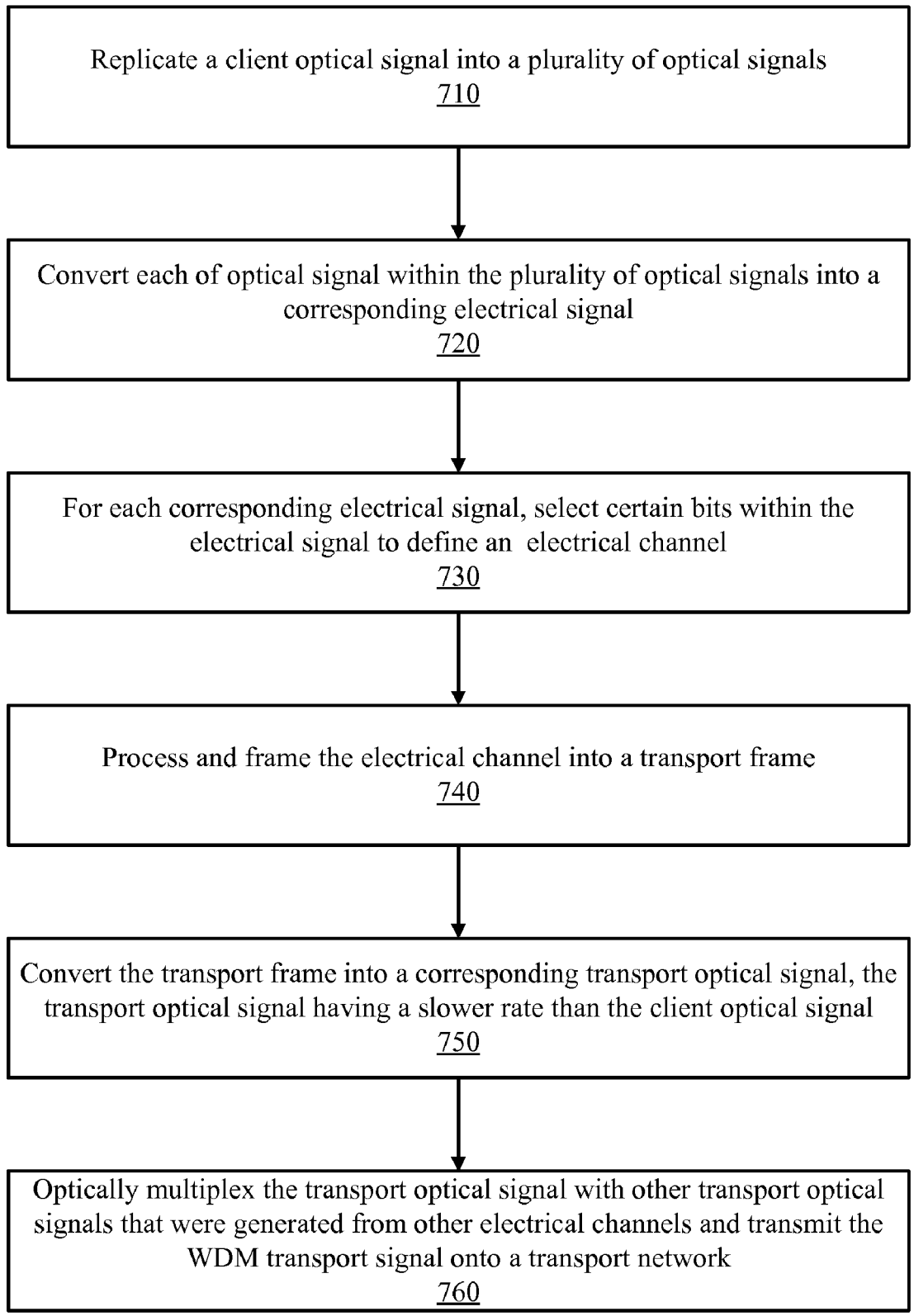
FIG. 7 is a flowchart showing a method for transmitting a client signal onto a transport network according to various embodiments of the invention.

FIG. 7 is a flowchart illustrating a method, independent of structure, for dividing a client signal into multiple channels and mapping those channels into transport frames according to various embodiments of the invention. An optical client signal is replicated into a plurality of optical signals and each of these replicated signals is transmitted on a channel 710. Each of these replicated signals is converted from an optical signal into a corresponding electrical signal 720.

For each of the corresponding electrical signals, a subset of bits is selected 730 and the plurality of the subset of bits across the channels represents all of the bits within the client signal. Each of these subset of bits is transmitted within a corresponding channel, processed and mapped into transport frames 740. This processing and mapping functionality may include the insertion of error correction information, such as forward error correction, to enable a more accurate reconstruction of the client signal at a transport receiver node.

Each of the channels having corresponding subset of bits mapped into frames is converted into the optical domain 750. The signal rate on each of these optical channels is slower than the rate of the client signal. In certain embodiments of the invention, the client signal is a 40 Gbps signal and each of the channels is 10 Gbps channels.

The optical channels are multiplexed together into a WDM signal 760. In certain embodiments, each of these channels is on a unique wavelength within the transport network. The WDM signal may also comprise wavelengths that do not contain data extracted from the client signal. This WDM signal is transmitted across the transport network to a receiver node that reconstructs the client signal from the optical channels within the WDM signal. This reconstructed client signal may then be transmitted from the receiver node to a corresponding client network.

While the invention has been described in conjunction with several specific embodiments, it is evident to those skilled in the art that many further alternatives, modifications, and variations will be apparent in light of the foregoing description. For example, any number of framers comprising forward error correction techniques may be used dependent upon network configurations. Furthermore, any number of framers may provide synchronization of the high-speed signals within any of the frames. Alternatively, CDRs may provide synchronization of the high-speed optical signals.

I claim:

1. An optical transmitter system comprising:
   an optical splitter having an input and a plurality of outputs, the input receiving a client signal carrying a sequence of bits, each of the plurality of outputs supplying a respective one of a plurality of client signal portions, each of the plurality of client signal portions carrying the sequence of bits;
   a first optical-to-electrical converter that is coupled to a first one of the plurality of outputs and converts a first one of the plurality of client signal portions into a first electrical signal, the first electrical signal carrying the sequence of bits;
   a second optical-to-electrical converter that is coupled to a second one of the plurality of outputs and that converts a second one of the client signal portions into a second electrical signal, the second electrical signal carrying the sequence of bits;
   a first data selector that receives the first electrical signal and selects a first subset of the sequence of bits, the first subset of bits being supplied to a first electrical channel;
   a second data selector that receives the second electrical signal and selects a second subset of bits of the sequence of bits, the second subset of bits being supplied to a second electrical channel and being different than the first subset of bits;
   a first electrical-to-optical converter that converts the first electrical channel to a first optical channel;
   a second electrical-to-optical converter that converts the second electrical channel to a second optical channel; and
   an optical multiplexer that multiplexes the first and second optical channels into a WDM signal.

2. The optical transmitter system of claim 1 wherein the first optical channel comprises a first optical wavelength and the second optical channel comprises a second optical wavelength that is different than the first optical wavelength.

3. The optical transmitter system of claim 1 wherein the first optical channel has a first polarity and the second optical channel has a second polarity that is different than the first polarity.

4. The optical transmitter system of claim 1 wherein the first subset of bits comprises a plurality of bits located within contiguous bit slots within the first electrical replicated client signal.

5. The optical transmitter system of claim 1 wherein the first subset of bits comprises a plurality of bits located within non-contiguous bit slots within the first electrical signal, the non-contiguous bit slots being separated from one another by a fixed number of bits within the first electrical replicated client signal.

6. The optical transmitter system of claim 1 further comprising: a third optical channel having a third subset of bits selected from the sequence of bits; and a fourth optical channel having a fourth subset of bits selected from the sequence of bits, wherein the optical multiplexer further multiplexes the third and fourth optical channels into the WDM signal.

7. The optical transmitter system of claim 6 wherein the client signal is a 40 Gbps signal and the first, second, third and fourth optical channels are 10 Gbps signals.

8. The optical transmitter system of claim 1 further comprising a first redundant path that is coupled between the first data selector and the second optical channel and that provides a redundant second subset of bits to the second optical channel.

9. The optical transmitter system of claim 8 wherein the redundant second subset comprises data from the client signal corresponding to the second subset of bits.

10. The optical transmitter system of claim 1 further comprising:
    a first framer that is coupled between the first data selector and the first electrical-to-optical converter and that maps the first subset of bits into a first plurality of transport frames; and
    a second framer that is coupled between the second data selector and the second electrical-to-optical converter and that maps the second subset of bits into a second plurality of transport frames.

11. A method for mapping a client signal into a transport signal, the method comprising:
    generating a plurality of optical client signal portions, each optical client signal portion within the plurality of optical client signal portions carrying a sequence of bit, the sequence of bits being carried on the client signal;
    converting a first one of the plurality of optical client signal portions into a first electrical signal, the first electrical signal comprising the sequence of bits;
    converting a second one of the plurality of optical client signal portions into a second electrical signal, the second electrical signal comprising the sequence of bits;
    selecting a first subset of bits within the first electrical signal; selecting a second subset of bits within the second electrical signal;
    mapping the first subset of bits and the second subset of bits within a plurality of transport frames;
    converting the plurality of transport frames into a plurality of optical signal wavelengths; and multiplexing the plurality of optical signal wavelengths into a WDM signal.

12. The method of claim 11 further comprising the step of routing a redundant subset of bits from a functioning electrical channel to a malfunctioning electrical channel.

13. The method of claim 12 wherein the redundant subset of bits is routed around a malfunctioning component within the malfunctioning electrical channel.

14. The method of claim 12 wherein the first and second subsets of bits are mapped into the transport frames in accordance with a standard specification.

15. The method of claim 11 wherein the client signal is a 40 Gbps optical signal and each of the optical signal wavelengths, within the plurality of optical signal wavelengths, is a 10 Gbps optical signal.

16. The method of claim 15 wherein the plurality of optical signal wavelengths consists of four optical signal wavelengths on four different wavelengths.

* * * * *